July 4, 1939.  A. T. SMITH  2,164,955
THERMOSTATIC CONTROL FOR LIQUID FUEL BURNERS
Filed May 17, 1937  2 Sheets—Sheet 1
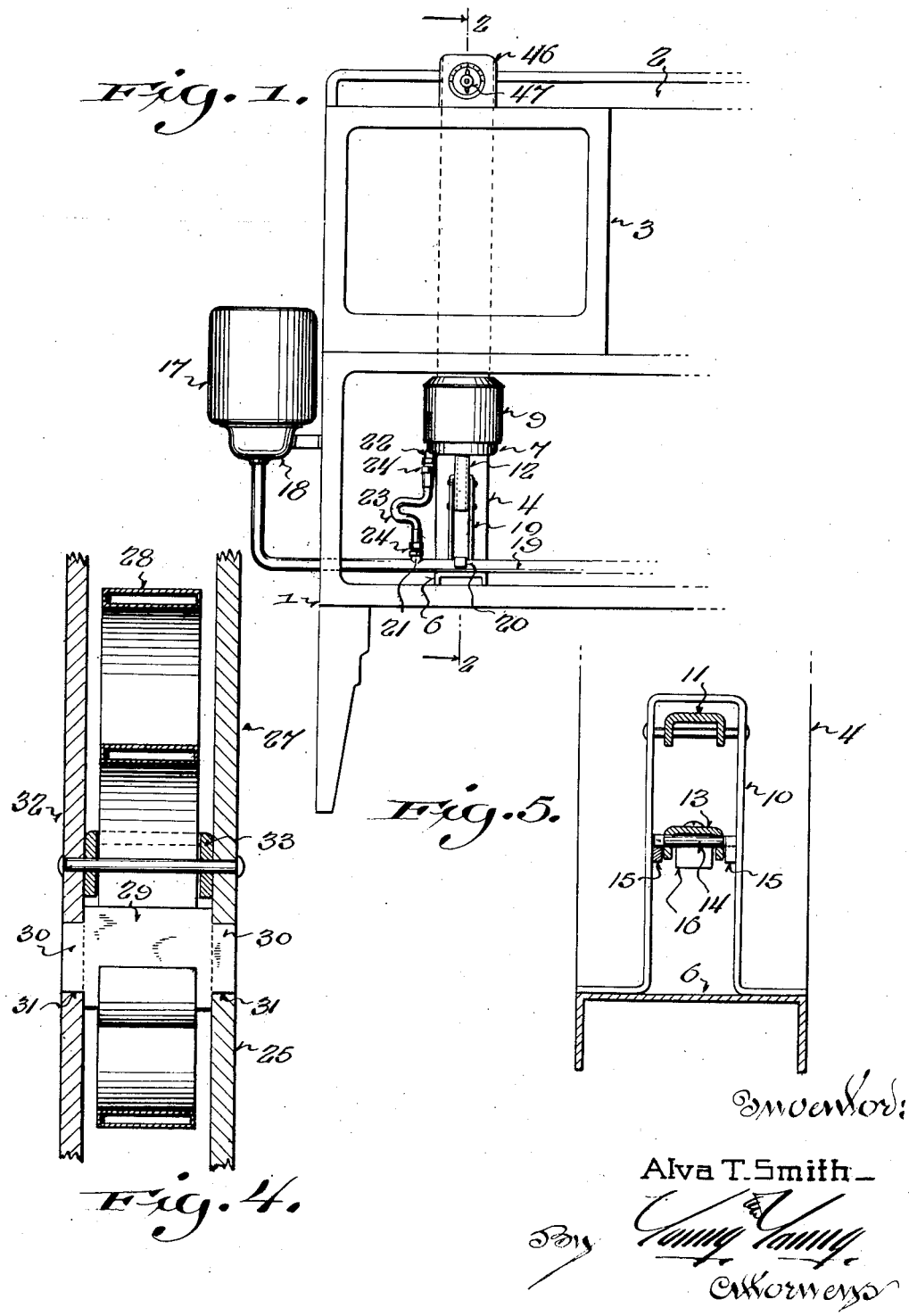
Inventor:
Alva T. Smith
By
Attorneys July 4, 1939.   A. T. SMITH   2,164,955
THERMOSTATIC CONTROL FOR LIQUID FUEL BURNERS
Filed May 17, 1937   2 Sheets-Sheet 2
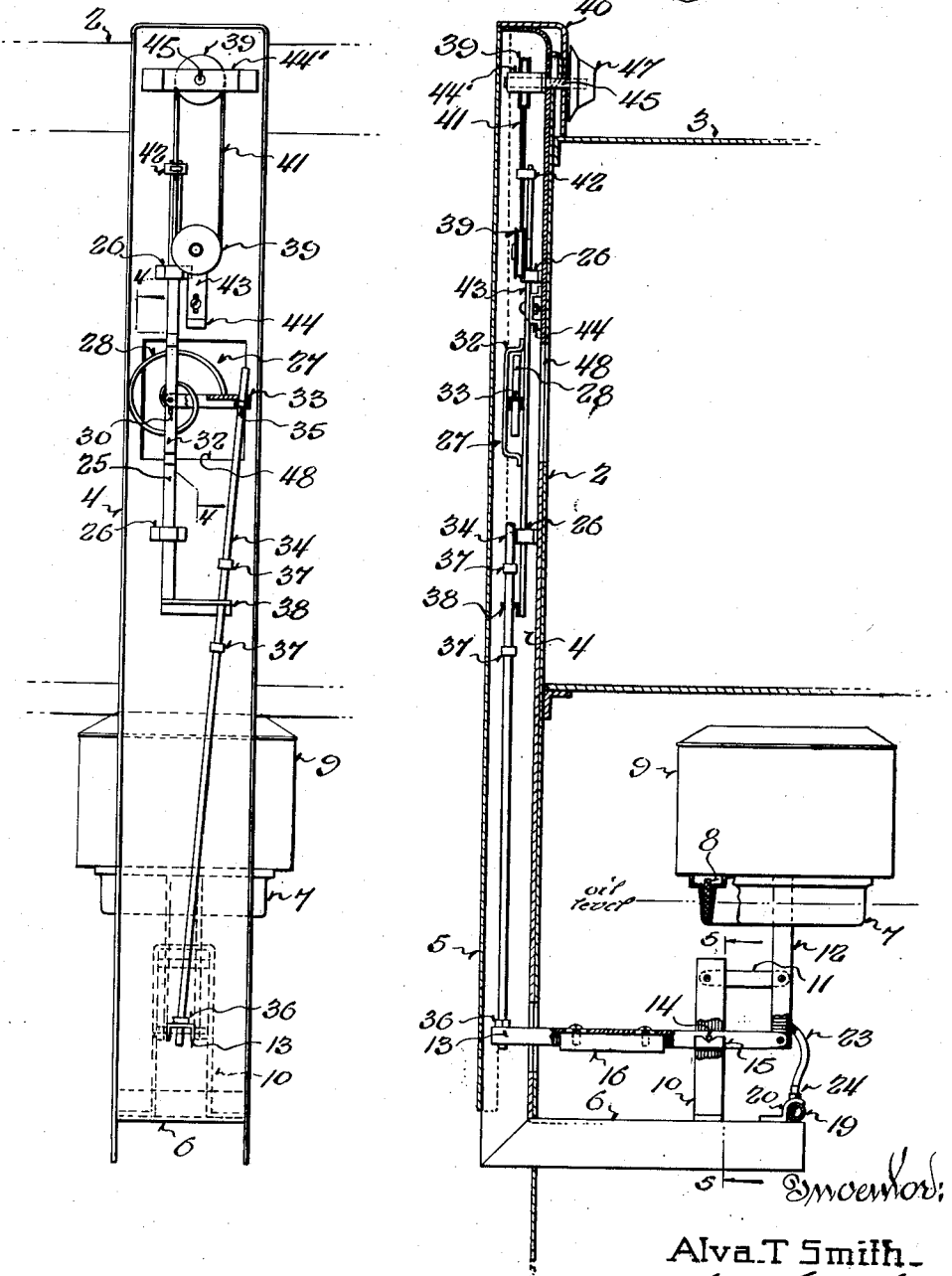
Inventor:
Alva T Smith Patented July 4, 1939

2,164,955

UNITED STATES PATENT OFFICE 2,164,955

THERMOSTATIC CONTROL FOR LIQUID FUEL BURNERS

Alva T. Smith, Milwaukee, Wis., assignor to National Enameling and Stamping Company, Milwaukee, Wis.

Application May 17, 1937, Serial No. 143,067

2 Claims. (Cl. 236—15)

This invention pertains to a thermostat control for liquid fuel burners of the "wickless" type, and has primarily for its object to provide an exceedingly simple, positive, and accurate thermostat-actuated mechanism for varying the relative position of the burner and source of fuel supply, to automatically regulate the fuel level in the burner, and thus control the burner flame.

Incidental to the foregoing, a more specific object of the invention resides in the provision of a vertically movable support for a liquid fuel burner flexibly connected with a constant level source of supply, in combination with a thermostat-controlled mechanism, affected by heat from the burner for shifting said support to vary the position of the burner with relation to the fuel supply level, and manually operable means for controlling the effective operation of the thermostat and for actuating said mechanism.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 is a fragmentary front elevation of a conventional oil stove, with the invention applied to the oven burner.

Figure 2 is a vertical section taken on the line 2—2 of Figure 1.

Figure 3 is a rear view of the thermostat-controlled mechanism, the housing cover being removed.

Figure 4 is a detail section taken on the line 4—4 of Figure 3, and

Figure 5 is a similar view taken on the line 5—5 of Figure 2.

In "wickless" types of liquid fuel burners, it is customary to regulate the flame by manually raising and lowering the burner with relation to a constant level fuel supply, to vary the oil level in the burner, and consequently the flame, in the manner disclosed in Letters Patent to J. S. Brennan No. 1,315,361, dated September 9, 1919. Therefore, it is impossible to employ conventional thermostat controls, such as used in gas and other types of burners, which regulate the quantity of fuel supplied to the burner.

The salient feature of the present invention resides in the highly novel thermostatic mechanism, capable of controlling the fuel level in a liquid fuel burner by varying the position of the burner relative to the supply level, and while the invention is applicable to liquid fuel burners for various uses, such as heaters, stoves, and the like, it is particularly advantageous in connection with cooking ovens, in which it is desired to maintain a substantially constant temperature. Therefore, for illustrative purposes, the invention is shown and described in connection with the oven burner of a conventional oil stove.

Referring now more particularly to the accompanying drawings, the numeral 1 designates generally the cabinet of a conventional sheet metal oil stove provided with a rear panel 2, upon which an oven 3 is mounted. Secured to the rear face of the panel 2, in alinement with the oven 3, is a vertical channel 4, which forms a housing for the thermostat control mechanism, to be hereinafter described. The channel 4 is closed by a removable cover 5, and extending forwardly from its lower end is an arm 6, upon which the burner head 7 is shiftably mounted, as will be later described. The burner head 7 is of a conventional structure comprising an annular trough for reception of a non-combustible capillary strip 8, and removably supported upon the burner is a drum 9, through which heat is delivered to the bottom of the oven 3.

The burner 7 is shiftably supported upon the arm 6 by means of an inverted U-shaped bracket 10, to which a channel link 11 is pivotally connected adjacent its upper end. The outer end of the link 11 is pivotally connected to a vertical channel 12, the upper end of which is secured to the burner head 7 for supporting the same, while the lower end of the channel is pivotally connected to a lever 13 provided with a fulcrum pin 14, supported in notched blocks 15 secured to the inner faces of the side arms of the bracket 10. The lever 13 is preferably of channel form, and adjustably secured thereon is a counter-balance weight 16, which is set to allow the weight of the burner to slightly overcome the same, and urge the rear end of the lever to raised position. Obviously, through the link and lever connection between the supporting bracket 10, and the channel 11, the burner 7 will maintain a horizontal position throughout its vertical movement.

As best shown in Figure 1, a liquid fuel reservoir 17 is supported at one end of the cabinet 1 by a support and bracket 18, and extending from the cup is a fuel supply line 19, attached to the arm 6 by a strap 20. The supply line 19, which runs through the entire stove to serve as many burners as may be employed, is provided with a branch nipple 21, while the burner head 7 is also provided with a nipple 22 connected with the branch nipple 21 through a flexible tube 23, attached to the nipples by conventional couplings 24.

The fuel reservoir 17 is provided with means for maintaining a constant fuel level in the supply line, in the manner disclosed in the Brennan Patent No. 1,343,343, dated June 15, 1920, and it will be apparent from the foregoing explanation that fuel supplied to the burner head 7, through the line 19 and flexible tube 23, will seek the level maintained in the supply line. Inasmuch as the size of the flame is controlled entirely by the height of fuel in the trough of the burner head, it will be apparent that vertical shifting of the burner head will regulate the flame, and consequently control the amount of heat from the burner.

To automatically accomplish the foregoing, a thermostatic mechanism is mounted within the channel housing 4, and comprises a vertically movable strap 25 slidably guided in spaced brackets 26, welded or otherwise secured to the back of the channel 4. Carried by the strap 5 is a thermostatic mechanism 27, comprising a "Borden" tube 28, the inner end of which is secured in any suitable manner to a fixed plate 29, the reduced ends 30 of which extend through slots 31, formed in the strap 25 and the yoke 32 secured thereto, to prevent the plate from turning. Openings 48 provided in the rear of the oven and channel adjacent the tube 28 allow the tube to be readily affected by the heat from the oven.

The outer free end of the tube 28 operatively engages the upper face of a channel arm 33, pivotally connected at its inner end to the strap 25 and the yoke 32, the pivotal end of the channel being cut out to allow the sides of the arm to straddle the inner convolutions of the tube.

Disposed between the inner end of the lever 13, and the arm 33, is a rod 34, the ends of which extend loosely through openings in the ends of the lever and arm. A collar 35, fast on the rod 34, adjacent its upper end, is engaged by the outer end of the arm 33, while the collar 36, secured upon the lower end of the rod 34, engages the lever 33 to control its operation in the manner to be described.

For the purpose of confining the movement of the lever 33 within predetermined limits, spaced collars 37 are secured on the rod 36, upon opposite sides of an angle arm 38, rigidly connected to the lower end of the strap 25.

To provide for manual shifting of the burner head 7, as well as controlling the effective operativeness of the thermostat tube 27, a pair of vertically spaced shives 39 and 40 are mounted within the channel 4 adjacent its upper end, and have trained thereover a cable 41, one stretch of which is secured to the upper end of the strap 25 by a clip 42. The lower shive 40 is pivotally mounted upon an arm 43, adjustably secured to the bracket 44 fastened to the rear wall of the channel. The upper shive 39 is fast on a shaft 45, which extends through the housing channel 4, the rear panel 2, and a cap 46 fitted over the channel at its upper end, and which is provided with suitable graduations to enable the desired setting of a hand-knob 47 secured upon the front end of the shaft 45.

Considering now the operation of the present invention in connection with the foregoing explanation and the accompanying drawings, when it is desired to extinguish the burner flame, the hand-wheel 47 is rotated to move the strap 25 to its lowermost position, as determined by the graduations on the cap 46. In this position of the strap 25, the arm 33, engaged by the end of the tube 27, has also been moved downwardly, and in turn has forced the rod 34 downwardly through engagement with the collar 35. Downward movement of the rod 34 causes the rear end of the lever 13 to be depressed by the collar 36, which raises the channel support 12 and the burner head 7 carried by the outer end of the lever so that the burner head is positioned above the fixed fuel level in the supply line, causing fuel to be drained from the burner and extinguish the burner flame.

To ignite the burner, the reverse operation takes place, and inasmuch as the weight of the burner is sufficient to overcome the counterbalance weight 13, and the weight of the rod 34 and the arm 33, supported by the rear end of the lever, the burner head moves downwardly a sufficient distance below the constant fuel supply level to saturate the capillary strip 8, and allow ignition of the fuel.

In the normal operation of the oven, after the burner has been initially ignited, the hand-knob 47 is set at the desired indicated temperature to be maintained in the oven, which determines the relative position of the thermostat tube and the pivotal arm 33, thus controlling the effective operativeness of the tube. For example, when the thermostat is raised to its highest operative position, the pivotal arm 33, supported at its outer end upon the rod 34, will be inclined downwardly from its pivotal axis and away from the end of the tube, thus requiring a considerable length of time before retraction of the tube is sufficient to cause its free end to engage the arm 33 and force the rod 34 downwardly to raise the burner 7 and reduce the flame. When the thermostat is set to its lowermost operative position, the reverse occurs, and the arm 33 inclines upwardly from its pivotal axis so that a slight retraction of the tube functions to raise the burner and reduce the flame.

Due to the fact that the thermostatic tube 27 is capable of movement far in excess of that required for shifting the burner head 7, the stop collars 37, in cooperation with the arm 38, function to limit the movement imparted to the rod 34, and confine the effective operation of the thermostat within a relatively narrow range of temperature, which insures maximum accuracy of control.

From the foregoing explanation, it will be readily seen that a comparatively simple, inexpensive, and accurate thermostat control has been provided for liquid fuel burners, wherein it is essential to vertically shift the burner with relation to a constant fuel supply level, in order to regulate the heat from the same.

I claim:

1. In a liquid fuel burner comprising a vertically movable burner head, and a fixed constant level fuel reservoir and supply line, said burner head having a depending leg, a flexible connection between said burner head and fuel supply line, means for vertically shifting and maintaining a horizontal position of said burner head, said means including a support, a lever pivotally mounted upon said support and pivotally connected to said depending leg, a parallel link pivotally connected to said support and leg, and a thermostat controlling actuation of said lever.

2. In a liquid fuel burner comprising, a vertically movable burner head, and a fixed constant level fuel reservoir and supply line, said burner head having a depending leg, a flexible connection between said burner head and fuel supply line, means for vertically shifting and maintaining a horizontal position of said burner head, including a support, a lever pivotally carried by said support and pivotally connected to said depending leg, and a parallel link pivotally connected to said support and leg, thermostatic mechanism for controlling actuation of said lever comprising a rod connected to one end of the lever and provided with spaced stops, a slidable bar engaging said rod between said stops, a lever pivotally connected to said bar, another stop on said rod engaged by said lever, a thermostatic element carried by said bar for actuating said lever, and manually operable means for shifting said bar with relation to said rod.

ALVA T. SMITH.